(12) United States Patent
Sorin et al.

(10) Patent No.: US 7,627,246 B2
(45) Date of Patent: Dec. 1, 2009

(54) WAVELENGTH DIVISION MULTIPLEXING PASSIVE OPTICAL NETWORKS TO TRANSPORT ACCESS PLATFORMS

(75) Inventors: Wayne V. Sorin, Mountain View, CA (US); Bernd Hesse, Redwood City, CA (US)

(73) Assignee: Novera Optics, Inc., Santa Clara, CA (US)

( * ) Notice: Subject to any disclaimer, the term of this patent is extended or adjusted under 35 U.S.C. 154(b) by 366 days.

(21) Appl. No.: 11/187,993

(22) Filed: Jul. 22, 2005

(65) Prior Publication Data

US 2007/0019956 A1 Jan. 25, 2007

(51) Int. Cl.
*H04J 14/00* (2006.01)

(52) U.S. Cl. .............................. 398/63; 398/68; 398/70

(58) Field of Classification Search .................. 398/63, 398/66–68, 70–72, 175, 176
See application file for complete search history.

(56) References Cited

U.S. PATENT DOCUMENTS

| | | | | |
|---|---|---|---|---|
| 7,440,696 B2* | 10/2008 | Ohkuma | ...................... | 398/51 |
| 2002/0063924 A1* | 5/2002 | Kimbrough et al. | ......... | 359/125 |
| 2005/0047785 A1* | 3/2005 | Hwang et al. | ................. | 398/72 |
| 2005/0123300 A1* | 6/2005 | Kim et al. | ..................... | 398/84 |
| 2005/0129402 A1* | 6/2005 | Kim et al. | ..................... | 398/79 |
| 2006/0275037 A1* | 12/2006 | Evans et al. | ................... | 398/71 |
| 2007/0165688 A1* | 7/2007 | Lee et al. | ..................... | 372/71 |

FOREIGN PATENT DOCUMENTS

| | | |
|---|---|---|
| DE | 42 26 838 A1 | 2/1994 |
| EP | 1 388 963 A2 | 2/2004 |
| EP | 1 507 351 A2 | 2/2005 |
| WO | WO 2005/076942 A2 | 8/2005 |

OTHER PUBLICATIONS

Soo-Jin Park, et al., "Fiber-to-the-Home Services Based on Wavelength-Division-Multiplexing Passive Optical Network," XP-011121526, Journal of Lightwave Technology, vol. 22, No. 11, pp. 2582-2591 (Nov. 11, 2004).

E.S. Son, et al., "Bidirectional WDM Passive Optical Network for Simultaneous Transmission of Data and Digital Broadcast Video Service," XP-002988622, Journal of Lightwave Technology, vol. 21, No. 8, pp. 1723-1727 (Aug. 2003).

(Continued)

*Primary Examiner*—Dalzid Singh
(74) *Attorney, Agent, or Firm*—Blakely, Sokoloff, Taylor & Zafman LLP

(57) ABSTRACT

Wavelength division multiplexing ("WDM") passive optical networks ("PON") to transport signals having various access platforms are described. For one embodiment, a WDM PON performs bi-directional communications, and includes an interface. The interface transfers one or more signals having a first platform to a WDM-PON data transmission platform at an access point of a network to propagate through a single transmission medium, to one or more remote distribution nodes in between a Central Office and an optical network unit. The single transmission medium carries three or more optical channels traveling in both directions.

26 Claims, 7 Drawing Sheets

OTHER PUBLICATIONS

Hyun Deok Kim, et al., "A Low-Cost WDM Source with an ASE Injected Fabry-Perot Semiconductor Laser," XP011047230, IEEE Photonics Technology Letters, vol. 12, No. 8, pp. 1067-1069 (Aug. 8, 2000).

PCT Notification of Transmittal of The International Search Report and the Written Opinion of the International Searching Authority or The Declaration for PCT Counterpart Application No. PCT/US2006/028434 Containing International Search Report (Nov. 23, 2006).

* cited by examiner

WAVELENGTH DIVISION MULTIPLEXING PASSIVE OPTICAL NETWORKS TO TRANSPORT ACCESS PLATFORMS

FIELD

Embodiments of the invention relate to Wavelength Division Multiplexing Passive Optical Networks ("WDM PON"), and more specifically, to using WDM PONs to transport various access platforms.

BACKGROUND

Most networks in the telecommunications networks of today include Passive Optical Networks ("PONs"). In PONs, generally most to all components which require power ("active components"), e.g., repeaters, relays, memory chips, processors, between the Central Office exchange and termination points at the customer premises are eliminated, and passive optical components are put into the network to guide traffic based on splitting the power of optical wavelengths to endpoints along the way. The passive splitters or couplers are merely devices working to pass or restrict light, and as such, have no power or processing requirements thereby lowering overall maintenance costs for the service provider.

FIG. 1 shows a typical PON 100 for an optical access architecture. As shown in FIG. 1, PON 100 includes an optical line terminator ("OLT") 101 located at a Central Office ("CO") and a set of optical network units ("ONU") 103, or optical network terminals, located at the customer premise. Each of the ONU 103 is connected to the OLT 101 through feeder fiber 102, e.g., an outside fiber plant, optical power splitter 104, and individual distribution fibers 105. Feeder fiber 102 may transmit optical signals at 125 Megabits per second ("Mbps"), 155 Mbps, 622 Mbps, 1.25 Gigabits per second ("Gbps"), 2.5 Gbps, 10 Gbps, or 40 Gbps, in accordance with standards used for various access platforms. Various access platforms, including various transmission formats, and communication and control protocols, e.g., Ethernet based PON ("EPON"), Broadband PON ("BPON"), Gigabit PON ("GPON"), and ATM based PON ("APON"), has been developed to deliver information, e.g., data, voice, and video, from the Central Office to each of the customer premises.

Access platforms, e.g., EPON, BPON, or GPON, use light having a wavelength of 1.49 microns ("um") to transmit information in downstream 106 direction and light having the wavelength of 1.3 um to transmit information in upstream 107 direction between the Central Office and the customer premises. OLT 101 contains a high power distributed feedback ("DFB") laser to produce the light at 1.49 um in downstream 106 direction, which is shared by a plurality, e.g., 16, 32, or more of ONUs 103. For example, for EPON access platform, the bandwidth of optical signals having the wavelength of 1.49 um and data transmission rate of 1.25 Gbps is shared between a plurality of ONU 103 using optical power splitter 104. Such configuration of a PON is inefficient because the power supplied to each of the ONUs 103 is reduced at least by the factor of 1/N, wherein N is the amount of ONUs 103 coupled to the power splitter.

ONU 103 typically uses lasers to produce light at 1.3 um within a large optical bandwidth of over 100 nm in upstream 107 direction. The wavelength of the light produced by such lasers may vary with the device distributing the light of the laser, time, temperature, or any other condition.

OLT 101 may service the plurality of ONU 103 through the use of optical power splitter 104 and access platform PON protocols to control the sending and transmission of signal across the shared access facility. Data may be transmitted downstream 106 from OLT 101 to each of ONU 103, and each ONU 103 processes the data destined to it by matching the address at the access protocol transmission unit header. Upstream 107 data from each of the ONU 103 to OLT 101 is transmitted according to access control mechanisms and protocols in the OLT 101, which include a time division multiplexing scheme, in which dedicated transmission time slots are granted to each individual ONU 103, to avoid data collision. As such, transport of information between the Central Office and customer premises depends on the type of the access platform used by the Central Office and customer premises. Further, each OLT 101 at the Central Office requires its own feeder fiber 102 to provide data transmission to and from the plurality of ONUs 103. In addition, a timing algorithm may be used in existing access platforms, which limits the distance between the OLT 101 and ONU 103 to 20 km.

Sharing the same bandwidth between a plurality of ONU 103 in an existing access platforms is not only inefficient, it also can give rise to security issues, because data transmitted from OLT 101 downstream may go to every user. This can produce an additional level of complexity to the data transmission, sometimes requiring scrambling the data code, data encryption, and the like.

SUMMARY

Wavelength division multiplexing ("WDM") passive optical networks ("PON") to transport signals having various access platforms are described. For one embodiment, a WDM PON performs bi-directional communications, and includes an interface. The interface transfers one or more signals having a first platform to a WDM-PON data transmission platform at an access point of a network to propagate through a single transmission medium, to one or more remote distribution nodes in between a Central Office and an optical network unit. The single transmission medium carriers three or more optical channels traveling in both directions.

Other features and advantages of embodiments of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, in which.

DETAILED DESCRIPTION

Figure 1:
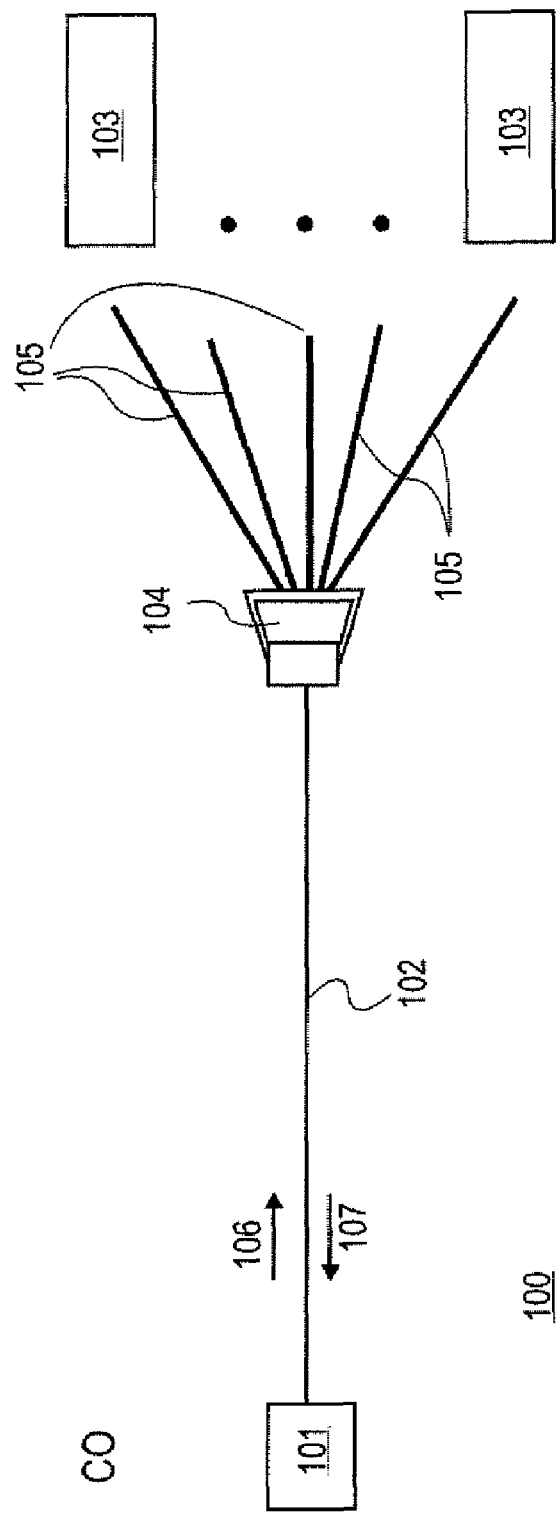
FIG. 1 shows a typical PON for an optical access architecture.

In general, wavelength division multiplexing passive optical networks ("WDM PONs"), e.g., Dense WDM ("DWDM") PONs, to transport various access platforms are described. The WDM PON provides a virtual point-to-point connection between a Central Office and one or more remote optical network units. For one embodiment, the WDM PON for performing bi-directional communication includes an interface to transfer a set of one or more signals having a first platform to a WDM PON data transmission platform at an access point of a network. The signals in the WDM PON transmission platform propagate through a single transmission medium to one or more remote distribution nodes in between a Central Office and an optical network unit. The single transmission medium carries three or more optical channels traveling in both directions. In one embodiment, the optical spacing between the optical channels is less than 10 nm, in accordance with DWDM transmission scheme. The interface includes three or more wavelength locked optical transmitters. The access point of a network may be the Central Office. The WDM-PON further includes another interface to transfer the WDM-PON data transmission platform back into the first platform of the set of one or more signals at a distribution point of the network. For one embodiment, the interface maintains a data sequence of the set of one or more signals by examining the data in each signal of the set of one or more signals and data modulating that information onto its own wavelength optical channel transmitted in the WDM-PON.

For another embodiment, the WDM PON includes a first interface to input a first set of one or more signals having a platform, e.g., an access platform, and output a second set of one or more signals through a single optical transmission medium, e.g., an optical feeder fiber. The second set of one or more signals is configured to comply with a WDM transmission platform/format. The second set of one or more signals may preserve the sequence of the data of the first set of signals in the first platform. The transport of the second set of one or more signals through the single transmission medium is platform independent. The WDM PON may include a second interface to input the second set of one or more signals from the single optical transmission medium and to output a third set of one or more signals. The third set of signals may have the platform of the first set of signals. The second set of one or more signals may include one or more wavelength locked signals generated by one or more wavelength locked transmitters. The WDM PON transporting access platforms may be future proof, because the data rate may be upgraded without changing the outside fiber plant. The second set of signals traveling through the single optical transmission medium may have adjustable data rate that allows increased transmission rate for the WDM PON system that transports access platforms. For example, the data rate of the second set of signals propagating at each WDM wavelength through the single optical feeder fiber may be scaled up over time abolishing the need for adding another optical feeder fiber. Using WDM PON to transport various access platforms may reduce the number of optical fibers in the optical transport layer at least by a factor of 10 resulting in substantial cost savings.

Figure 2:
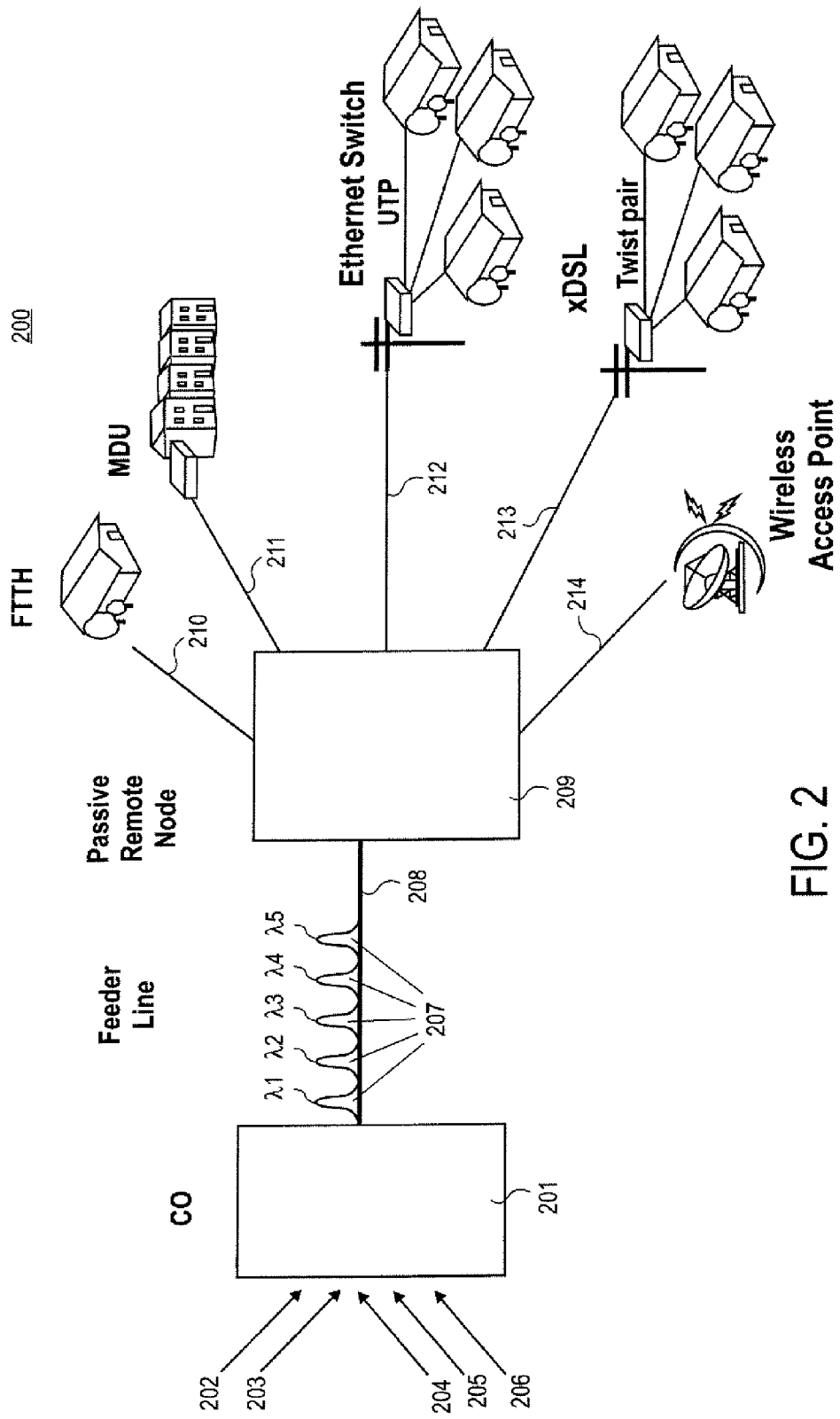
FIG. 2 shows one embodiment of a WDM PON system, which provides a transport for various platforms.

FIG. 2 illustrates an embodiment of system 200, which provides a transport for various platforms. The system 200 includes an interface 201 to input set of signals 202-206. Interface 201 may be an optical line terminal located at a Central Office ("CO"). For one embodiment, set of signals 202-206 has different platforms, e.g., different data, voice, and video transmission formats, protocols, and standards. For example, signal 202 is an EPON access platform, signal 203 is a BPON access platform, signal 204 is a GPON access platform, signal 205 supports Synchronous Optical Network or Synchronous Digital Hierarchy ("SONET/SDH") data transmission platform, and signal 206 supports Ethernet standard platform, e.g., Gigabit Ethernet ("GE") standard to supply an Ethernet switch or a Digital Subscriber Line Access Module ("DSLAM"). In another embodiment, sets of signals 202-206 may have the same platform, e.g., EPON access platform. In another embodiment, at least one of sets of signals 202-206 may have a wireless platform, e.g. a wireless fidelity ("Wi-Fi") platform, or Wi-Max platform. In alternate embodiments, sets of signals 202-206 may be multiple tone, digital electronic, analog electronic, and optical sets of signals.

As shown in FIG. 2, interface 201 outputs one or more sets of signals 207 through an optical transmission medium 208, e.g., a single optical fiber. Each of the set of signals 207 has a wavelength $\lambda 1, \lambda 2, \lambda 3, \lambda 4$, or $\lambda 5$, wherein each of the wavelengths $\lambda 1, \lambda 2, \lambda 3, \lambda 4$, or $\lambda 5$ is mapped to each of set of signals 202-206. The wavelengths $\lambda 1$-$\lambda 5$ comply with WDM format, e.g., DWDM format, such that the set of signals 207 do not share the same optical bandwidth while propagating through the same optical transmission medium 208. Each of the set of signals 207 may preserve a sequence of the data, or protocol in the respective platform of each of set of signals 202-206. That is, each of set of signals 202-206 may be transferred bit-by-bit into each of set of signals 207 having wavelengths $\lambda 1$-$\lambda 5$. As such, signal 207 having wavelength $\lambda 1$ may preserve ("maintain") the sequence of the data, and/or protocol, in the platform of signal 202; the signal of wavelength $\lambda 2$ may preserve the sequence of the data, and/or protocol, in the platform of signal 203, the signal of wavelength $\lambda 3$ may preserve the sequence of the data, and/or protocol, in the platform of signal 204, the signal of wavelength $\lambda 4$ may preserve the sequence of the data, and/or protocol, in the platform of signal 205, and the signal of wavelength $\lambda 5$ may preserve the sequence of the data, and/or protocol, in the platform of signal 206. Wavelengths $\lambda 1$-$\lambda 5$ comply with Dense WDM ("DWDM") scheme, Coarse WDM ("CWDM") scheme, or a combination thereof. For one embodiment, in accordance with DWDM scheme, the optical spacing between each wavelength channel $\lambda 1$-$\lambda 5$ is less than 10 nm. More specifically, the optical spacing between wavelengths $\lambda 1$-$\lambda 5$ may comply with International Telecommunication Union ("ITU") grid specification of 25 GHz-200 GHz, or, in wavelength units, from about 0.2 nm to about 1.6 nm. For another embodiment, the optical spacing between wavelengths $\lambda 1$-$\lambda 5$ comply with Coarse WDM ("CWDM") scheme of at least 20 nm. For an embodiment, wavelengths $\lambda 1$-$\lambda 5$ may be in the approximate range of 1420 nm to 1650 nm, corresponding to transmission bands of the optical transmission medium 208.

As shown in FIG. 2, an interface 209 inputs set of signals 207 from optical transmission medium 208 and outputs set of signals 210-214 to deliver the information to various users. Interface 209 may be at a remote location from the Central Office, at a distance, e.g., 0 to 100 kilometers ("km"), and more specifically, at a distance from around 1 km to around 30 km. For one embodiment, interface 209 may be an optical network unit at a remote location.

Set of signals 210-214 has the platform of a corresponding set of signals 202-206. The signal 210 may have EPON access platform of signal 202 to deliver the information, e.g., data, voice, and video, in Fiber To The Home ("FTTH") fiber-optic design architecture. The signal 211 may have BPON access platform of signal 203 to deliver the information in Multi-Dwelling Units ("MDU") design architecture. The signal 212 may have GPON access platform of signal 204 to deliver the information to the Ethernet Switch, which further delivers the information to subscribers through unshielded twisted pair ("UTP") cables. The signal 213 may support Ethernet standard of signal 206 to deliver the information to the DSLAM, which further delivers the information through twisted pair cables. The signal 214 may have a wireless access platform, e.g., a Wi-Fi platform, or Wi-Max platform, and may be sent to a wireless access point. Signal 214 may contain information provided by signal 205. For another embodiment, set of signals 210-214 may have the platform different from the platform of corresponding set of signals 202-206.

WDM PON may provide bi-directional transmission of the set of signals through a single optical transmission medium 208, as described in further details below with respect to FIGS. 4 and 5. For one embodiment, interface 201 includes an electrical to optical (E/O), optical-to-electrical-to optical (O/E/O), or optical-to-optical (O/O) converter. For one embodiment, interface 209 includes O/E/O converter, O/O converter, or O/E/O converter, as described in further details below with respect to FIGS. 4 and 5.

Figure 3:
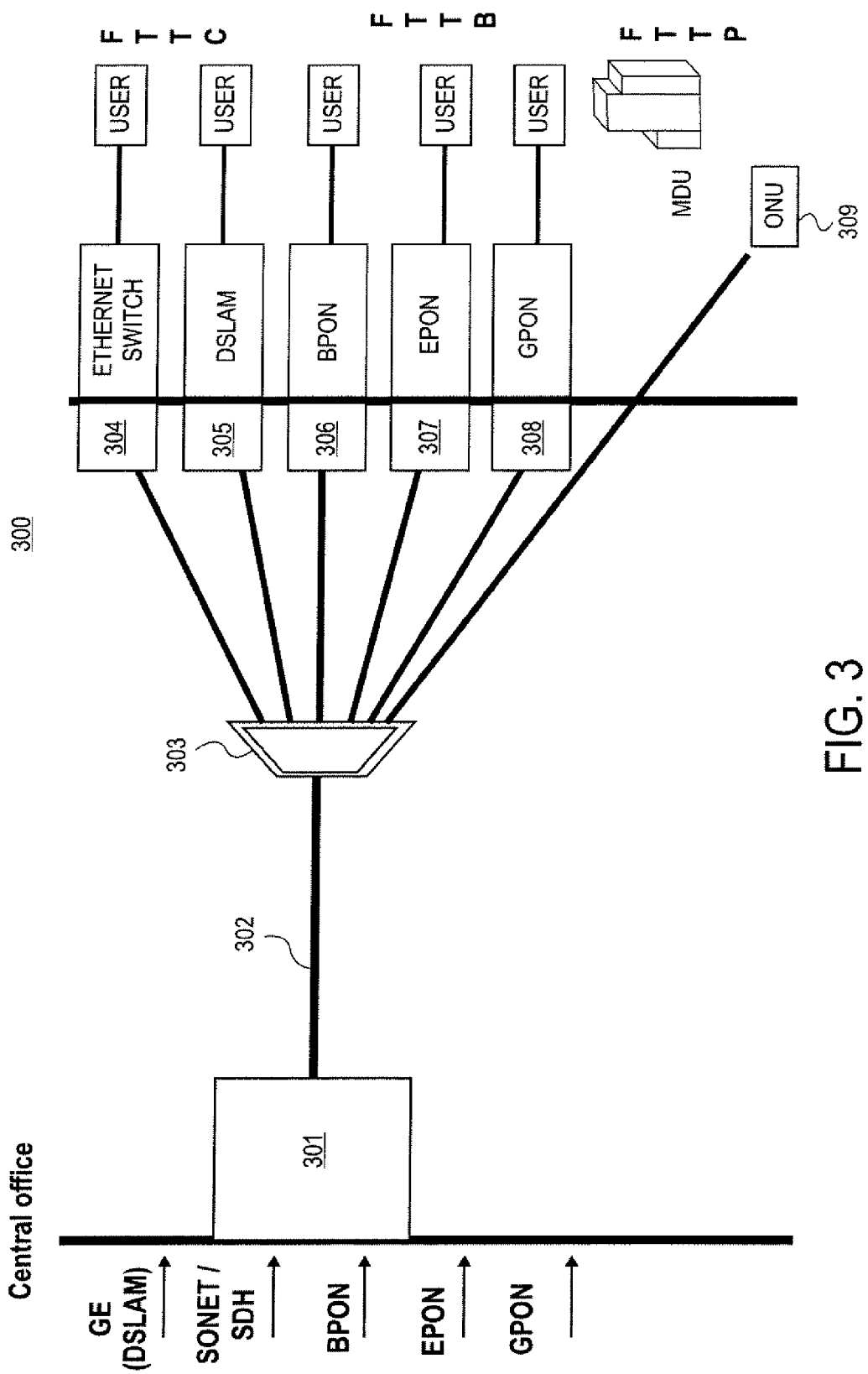
FIG. 3 shows another embodiment of a system to transport various platforms.

FIG. 3 shows another embodiment of the system 310 to transport various platforms. As shown in FIG. 3, system 310 includes Optical Line Terminal ("OLT") 301 located at the Central Office. Set of signals of various communication platforms ("applications"), such as GE (Gigabit Ethernet), SONET, BPON, EPON, and GPON input into the Optical Line Terminal ("OLT") 301, as shown in FIG. 3. In one embodiment, set of signals at the input of OLT 301 may have a Wi-Fi access platform (not shown). OLT 301 outputs set of signals configured in accordance with WDM scheme, e.g., DWDM scheme, through the single optical fiber 302, e.g., an outside plant feeder fiber, as described above with respect to FIG. 2. For one embodiment, set of signals transmitted through the single optical fiber may preserve data transmission formats, protocols, or standards of respective applications. As shown in FIG. 3, system 310 further includes an optical multiplexer/demultiplexer 303 to demultiplex WDM set of signals propagating through optical fiber 302 from the Central Office. The multiplexer/demultiplexer 303 further distributes the respective WDM set of signals with respective preserved sequence of the data, and/or protocols, to respective Optical Network Units ("ONU") 304-309 of system 310 located near the remote customers (or users), e.g., as shown in FIG. 3. ONU 304-308 of system 310 provide interfaces to Ethernet switches, DSLAM, BPON, EPON, GPON, Wi-Fi, or WiMax access platforms to deliver the information through Fiber-to-the-Curb ("FTTC"), Fiber-to-the-Building ("FTTB"), Fiber-to-the-Premise ("FTTP"), MDU, or any other access design architectures, as shown in FIG. 3. As shown in FIG. 3, system 300 transparently transports the applications to respective customers providing virtual point-to-point connection between a Central Office and a customer location. The system 300 is a future proof system, because it may be upgraded without changing an outside fiber plant. That is, the data transmission rate at each wavelength through the single optical fiber 302 may be scaled up, or protocol may be changed in the future without a need of changing the outside fiber plant, e.g., adding another optical fiber, or a MUX/DMUX. For example, the data transmission rate may be increased from 100 Mbps/wavelength to 10 Gbps/wavelength without adding another optical fiber. The system 300 is transparent for any access application, such that an inventory of matching access components for different applications is no longer needed.

Figure 4:
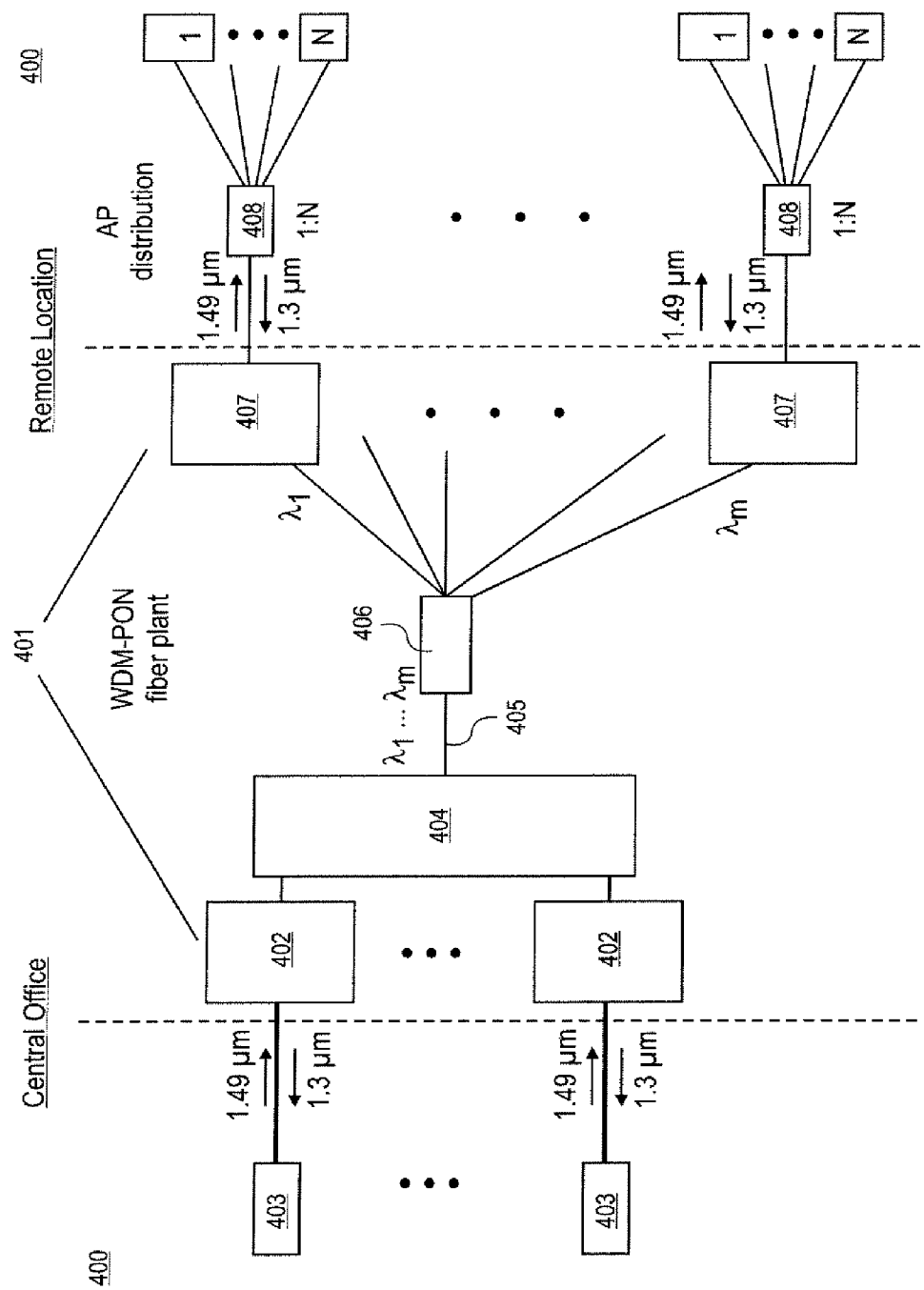
FIG. 4 shows an embodiment of a WDM PON fiber plant transporting an EPON platform.

FIG. 4 shows an embodiment of WDM PON fiber plant 401 transporting an EPON platform. As shown in FIG. 4, WDM PON fiber plant 401, e.g. DWDM PON fiber plant, includes 1 to M converters 402, wherein M is an integer number, e.g., 16. Each of converters 402 inputs EPON set of signals from each of 1 to M EPON Optical Line Terminals ("EPON OLT") 403 and outputs WDM set of signals, e.g., DWDM set of signals. For one embodiment, set of signals from EPON OLT 403 are optical signals having a wavelength of 1.49 um in compliance with EPON access platform for downstream direction from a Central Office to customer premises. Each of the WDM set of signals produced by converters 402 has a wavelength $\lambda m$, which is mapped to a signal from a respective EPON OLT 403, as described above with respect to FIG. 2. WDM PON 401 further includes a multiplexer/demultiplexer ("MUX/DMUX") 404 coupled to converters 402 to multiplex WDM set of signals for transmission through a single optical fiber 405. For one embodiment, MUX/DMUX 404 includes Arrayed Waveguide Grating Multiplexers and Demultiplexers ("AWG MU/DMUX") known to one of ordinary skill in the art of telecommunications. For another embodiment, MUX/DMUX 404 includes thin film dielectric filters known in the art of telecommunications. For one embodiment, converter 402 is an electrical to optical (E/O), optical-to-electrical-to-optical (O/E/O), or optical-to-optical (O/O) converter.

As shown in FIG. 4, fiber plant 401 further includes a MUX/DMUX 406, which demultiplexes WDM set of signals from optical fiber 405, such that a WDM signal having a respective wavelength $\lambda m$ is sent to a respective converter 407. MUX/DMUX 406 may be located at a remote location from a Central Office. For one embodiment, MUX/DMUX 406 includes AWG MUX/DMUX, thin film dielectric filters, or a combination thereof. AWG MUX/DMUX and thin film dielectric filters are known to one of ordinary skill in the art of telecommunications. For one embodiment, converter 407 is an O/E/O converter, or O/O converter. As shown in FIG. 4, each of converters 407 inputs a WDM signal at a WDM wavelength and outputs an optical EPON signal, which is sent to a 1:N power splitter 408 for access platform distribution between customer premises, e.g., between EPON ONUs 1 to N, wherein N may be any integer number, e.g., 32. The WDM-PON optical transport looks transparent to EPON OLTs 403 and to EPON ONUs, as shown in FIG. 4.

The fiber plant 401 is used for transport in opposite directions, downstream and upstream, as shown in FIG. 4. The optical wavelength used in an EPON system is 1.49 microns for downstream traffic and 1.3 microns for upstream traffic. EPON wavelengths are converted to different WDM wavelengths sent over the WDM-PON fiber plant 401 since it uses a much denser wavelength spacing plan so to allow many wavelengths to be transported over a single optical feeder fiber. That is, overlaying EPON on to the WDM PON transmission platform, e.g., WDM PON provides increased data transmission bandwidth from the Central Office out to the remote sites over just a single optical fiber 405.

Figure 5:
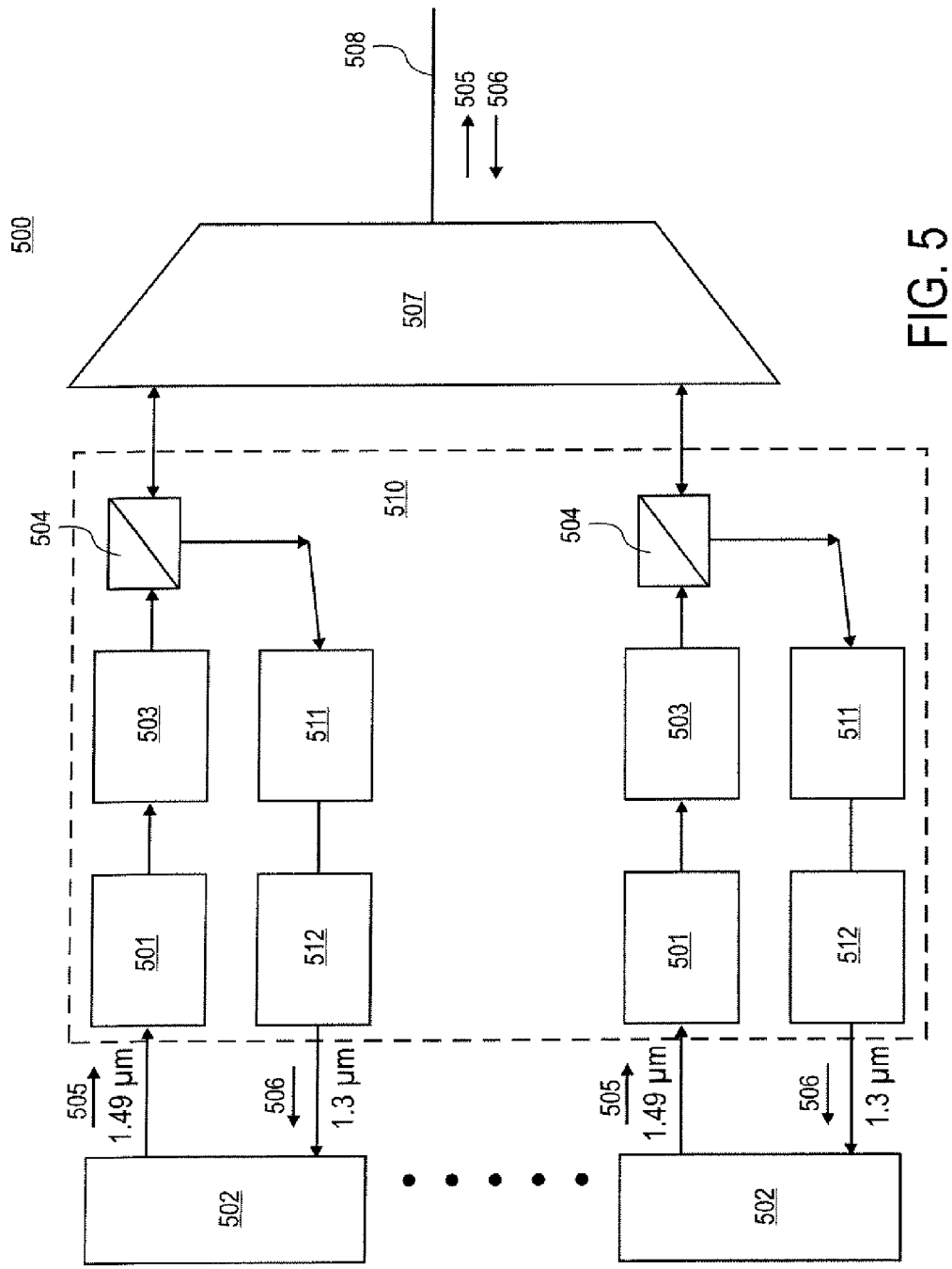
FIG. 5 shows a block diagram of an embodiment of a line terminal of a WDM PON to transport access platforms.

FIG. 5 shows a block diagram of an embodiment of a line terminal of a WDMPON, e.g., DWDM PON, to transport access platforms. As shown in FIG. 5, line terminal 510 located at a Central Office includes one or more receivers 501 to receive an optical signal in downstream direction 505 from one or more access platform optical line terminals ("AP OLTs") 502 and one or more receivers 511 to receive an optical signal in upstream direction 506 from remote nodes. For one embodiment, AP OLTs 502 may be an EPON, GPON, BPON, or any other access platform optical line terminals. For an embodiment, AP OLTs 502 may produce optical signals at a data transmission rate of 125 Mbps, 155 Mbps, 622 Mbps, 1.25 Gbps, 2.5 Gbps, 10 Gbps, or 40 Gbps, which is determined by standards, formats, and protocols of respective access platforms. For one embodiment, an optical signal from AP OLT 502 in a downstream direction 505 has a wavelength of 1.49 um and an optical signal in upstream direction 506 has a wavelength of 1.3 um. For one embodiment, receivers 501 and 511 may include a bit error correction scheme to correct for error bits of incoming set of signals. As shown in FIG. 5, one or more receivers 501 output electrical signals to drive one or more transmitters 503 and one or more receivers 511 output electrical signals to drive one or more transmitters 512.

Receivers 501 examine the data in set of signals from AP OLT 501 and produce set of electrical signals that maintain a data sequence, or protocols, of each of the set of signals from AP OLT 501. Transmitters 503 driven by the receivers 501 generate optical signals having wavelengths in compliance with a WDM transmission scheme, as described above with respect to FIG. 2. That is, each of the transmitters produces a modulated optical signal having a wavelength in a WDM-PON transmission platform. The wavelength of the modulated optical signal is mapped to the respective AP OLT 501.

Optical signals generated by transmitters 503 maintain the data sequence, and/or protocol, of the set of signals from AP OLT 501. Transmitters 503 include at least one wavelength locked light source to produce an optical signal having a locked wavelength, such that the wavelength of the optical signal is steady and does not wander with time, temperature, or any other condition. For one embodiment, a wavelength locked light source may be a wavelength locked Fabry-Perot laser diode, a reflective semiconductor optical amplifier (RSOA), or other similar optical light source configured to operate below a lasing threshold when being suppressed by an injected spectral light signal. The wavelength locked light source may also be a reflective modulator, e.g., Lithium Niobate (LiNbO3) modulator. For one embodiment, transmitters 503 include a wavelength specific light source, e.g., DFB laser, Distributed Bragg Reflector ("DBR") laser, tunable laser, or similar optical transmitter configured to transmit light having a specific wavelength.

For an embodiment, one or more light sources of transmitters 503 may include directly modulated or externally modulated light sources. The externally modulated light source may include Lithium Niobate modulator, electro-absorption modulator, or any combination thereof, to modulate the light in accordance with the data transmission rate, e.g., 125 Mbps, 155 Mbps, 622 Mbps, 1.25 Gbps, 2.5 Gbps, 10 Gbps, and 40 Gbps. The line terminal 510 further includes one or more band splitting filters 504 to optically separate the set of signals traveling in downstream direction 505 from set of signals traveling in upstream direction 506. Next, the line terminal 510 includes a MUX/DMUX 507 to multiplex optical set of signals traveling in downstream direction 505 and demultiplex the optical set of signals traveling in upstream direction 506. For one embodiment, MUX/DMUX 507 may include circulators to separate optical signals traveling in downstream direction 505 and upstream direction 506. The optical signals produced by transmitters 503 are multiplexed by MUX/DMUX 507 to transmit through a single optical fiber 508. Data transmission rate for the optical signals traveling along the single optical fiber 508 may be changed without the need of changing the number of fibers for outside fiber plant. Another AP OLT 502 may be added to transport information to other remote modes through the same single optical fiber 508. For one embodiment, MUX/DMUX 507 is an AWG with a free spectral range ("FSR") to multiplex/demultiplex light having wavelengths in the approximate range of 1420 nm to 1650 nm. For one embodiment, MUX/DMUX 507 may have the spacing between optical channels less than 10 nm. In one embodiment, MUX/DMUX 507 is an arrayed waveguide MUX/DMUX having the optical spacing between adjacent optical channels in the range of 25 GHz-200 GHz.

Transmitters 512 driven by receivers 511 produce optical signals, which are delivered to respective AP OLTs 502. For one embodiment, transmitters 512 produce optical signals having a wavelength of 1.3 nm in compliance with access platform standards for an upstream traffic. For one embodiment, transmitters 512 include low power Fabry-Perot lasers known to one of ordinary skill in the art.

Figure 6:
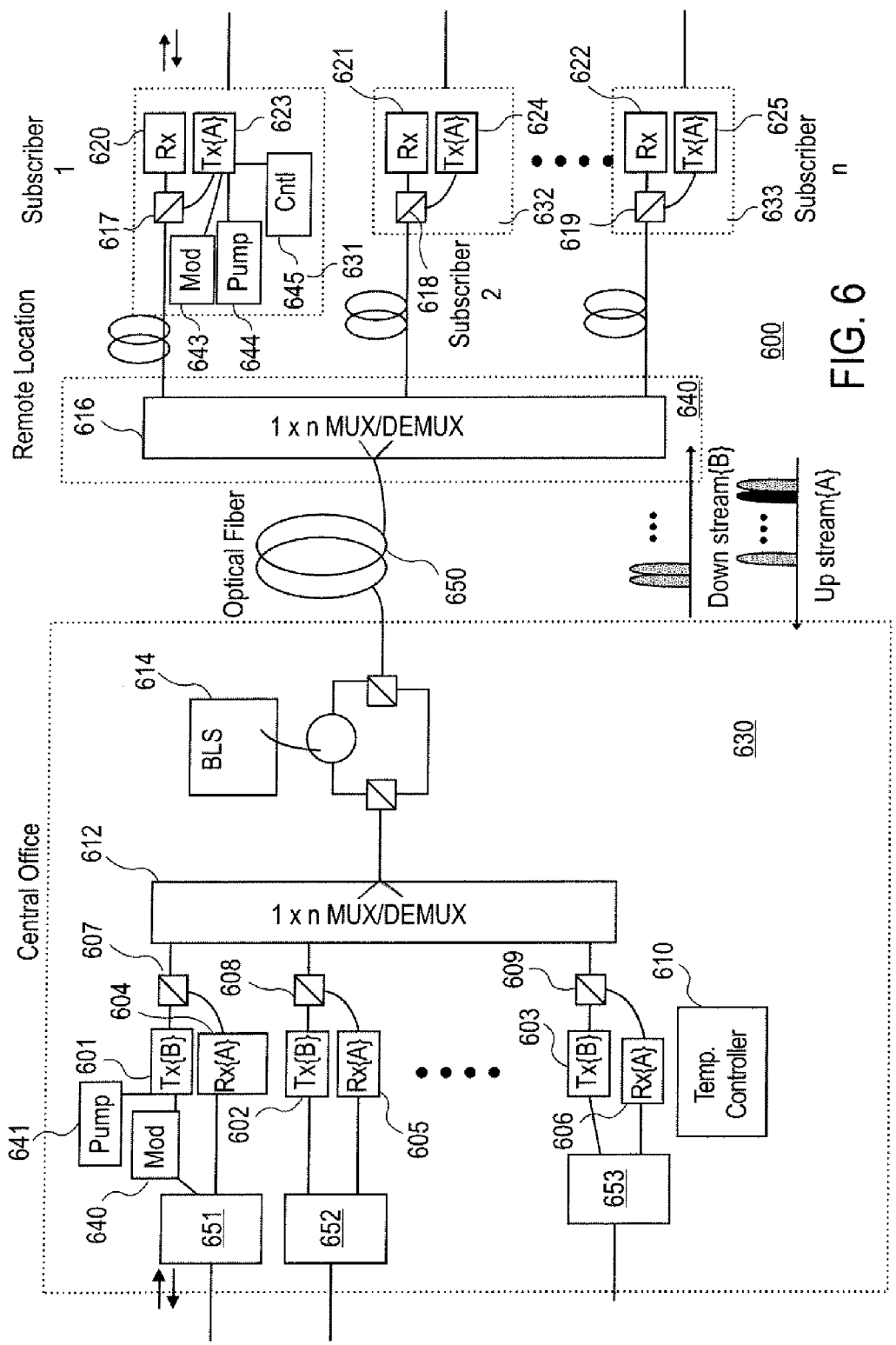
FIG. 6 shows a block diagram of another embodiment of a WDM PON to transport access platforms.

FIG. 6 shows a block diagram of another embodiment of a WDM PON to transport access platforms. The WDM PON 600, e.g., DWDM PON, may include an interface 630 located at a Central Office, a remote node 640, and a plurality of end user locations. As shown in FIG. 6, the interface 630 contains one or more optical-to-electrical (O/E) converters 651-653 to receive and examine data of set of one or more signals having an access platform. The access platform of the set of one or more signals may be an EPON, BPON, SONET, DSL, GE, and WiMax platform. Converters 651-653 may transfer bit-by-bit the received data of set of one or more signals into electrical set of signals to drive one or more transmitters 601-603. As shown in FIG. 6, the interface 630 may contain one or more optical receivers 604-606, one or more band splitting filters 607-609, a 1×N multiplexer/demultiplexer 612, a broadband light source 614, and an optional temperature controller 610. For one embodiment, transmitters 601-603 may include a wavelength specific light source, e.g., a distributed feedback ("DFB") laser. Each wavelength-specific light source may have an associated modulator and gain pump. For example, a first transmitter 601 may be a distributed feedback laser coupled to an associated modulator 640 and a gain pump 641. As shown in FIG. 6, the gain pump 641 and modulator 640, which is driven by electrical signals from converter 651, may each supply the electrical current to the active region of the light source.

Each remote location may contain an optical network unit (ONU) 631-633. As shown in FIG. 6, each ONU 631-633 includes respective optical receivers 620-622, and transmitters 623-625. Each ONU 631-632 provides an interface between a set of signals having a WDM platform and a set of signals having an access platform, as described above with respect to FIGS. 2-5. For one embodiment, an access platform may be may be an EPON, BPON, SONET, DSL, GE, or WiMax platform of the respective signals at the input of the interface 630 at the Central Office.

For one embodiment, transmitters 623-625 include a wavelength-locked light source. Transmitters 623-645 may have an associated modulator and gain pump. For example, transmitter 623 is coupled to modulator 143. For example, the first remote location may contain a first ONU 631 with a first optical receiver 620, a first wavelength-locked light source 623, such as a Fabry-Perot laser diode, a first band splitting filter 617, a first modulator 643, and a first gain pump 644. The first band splitting filter 617 is configured to direct wavelengths in a first wavelength band from a transmitter in the interface 630 to the optical receiver 620. The first band splitting filter 617 is also configured to direct wavelengths in a different wavelength band from the broadband light source 614 into the first wavelength-locked light source 623. In one embodiment, to optically diagnose the infrastructure of WDM PON 600, a WDM Optical Time Domain Reflectometer ("OTDR") coupled to the optical fiber 650 may be used. The Optical Time Domain Reflectometer may be used to detect faults such as breaks in the optical cables, such as the optical cables going between a remote node and the central office as well as the optical cables going between a remote node and each subscriber's location.

As shown in FIG. 6, transmitters 601-603 in interface 630 may be used for downstream communications B in the WDM PON through optical fiber 650 to supply data to subscribers at a first data rate. The wavelength-locked light sources 623-625 in the remote locations may transmit upstream communications A in the WDM PON through optical fiber 650 to supply data signals at a second data rate back to the optical receivers 604-606 in the interface 630. The first data rate may be asymmetric or in other words at a different bit rate compared to the second data rate. The first data rate for downstream communications B, such as 1 gigabyte per second, may be greater than the second data rate for upstream communications, such as 100 megabytes per second.

The pump 641 supplies a bias current to the transmitter 601. The bias current cooperates with a signal provided by the data modulator 640 to generate the downstream data signal from the transmitter 601. Similarly, the pump 644 supplies a bias current to the wavelength-locked light source 623. The bias current cooperates with a signal provided by the second data modulator 643 to generate the upstream data signal from the wavelength-locked light source 623.

The second 1×N multiplexer/demultiplexer 616 at the remote node 640 may be used for both routing the wavelengths between the subscribers' locations and the interface 630 at the Central Office as well as supplying a separate spectral slice from a broadband light source 614 to wavelength lock an output wavelength of each wavelength-locked light sources 623-625.

The broadband light source 614 supply an optical signal containing a first band of wavelengths, such as the C-band (1530 nm~1560 nm), to the second 1×N multiplexer/demultiplexer 616.

The second 1×N multiplexer/demultiplexer 616 in the remote location spectrally slices this broadband light signal from the broadband light source 614. A first port of the 1×N multiplexer/demultiplexer 616 couples via an optical cable to the ONU 631. The 1×N multiplexer/demultiplexer 616 wavelength locks the output wavelength of the first wavelength-locked light source 623 by injecting a spectral slice into the wavelength-locked light source 623. The wavelength-locked light source 623 is operated below the lasing threshold when being suppressed by the first injected spectral slice. The wavelength-locked light source 623 locks its output wavelength to approximately the wavelength of the injected spectral slice. Each port of the 1×N multiplexer/demultiplexer 616 generates a spectral slice of the broadband light signal with a different wavelength within the wavelength range of the broadband light signal.

Each converter 620-623 in the remote locations is configured, via its band splitting filters 617-619, to receive a wavelength signal corresponding to the associated transmitters 601-603 in the interface 630 at the Central Office. Each of optical receivers 604-606 in the interface 630 is configured, via its band splitting filters 607-609, to receive a wavelength signal corresponding to the associated wavelength-locked light source 623-625 in a remote location.

The wavelength-locked light source may be a Fabry-Perot laser diode, a Reflective Semiconductor Optical Amplifier (RSOA), or other similar optical transmitter configured to operate below a lasing threshold when being suppressed by an injected spectral light signal. The wavelength-specific light source may be a Distributed FeedBack (DFB) laser, DBR laser (Distributed Bragg Reflector) laser, tunable external cavity laser or similar optical transmitter configured to transmit a repeatable specific wavelength with enough power to transmit at a high data speed.

A temperature controller, such as the temperature controller 145 at the wavelength-locked light source 623, may alter the operating temperature of the wavelength-locked light source to fine tune its resonant wavelength. Similarly, a temperature controller, such as the temperature controller 110 at interface 630, may alter the operating temperature of the wavelength-specific light source to fine tune its resonant wavelength.

The modulator may be a direct modulator or an external modulator. The direct modulator may cooperate with a gain pump to directly data modulate the wavelength-specific light source. The direct modulation alters a gain of its associated wavelength-specific light source or wavelength-locked light source. The external modulator, such as LiNbO3 (Lithium Niobate) or EA (electro-absorption) modulators, data modulates its associated wavelength-specific light source or wavelength-locked light source. The external modulator modulates by passing or blocking the light generated from the light source in a separate stage from where the lasing action occurs in the light source. The gain pump may also control the bias current supplied to its associated optical transmitter to alter the resonant wavelength of its optical transmitter.

For some applications, such as Fiber To The Curb (FTTC) high data rates in at least one direction are desired. At data rates above 1 Gigabits per second (Gbps) it may become difficult to directly modulate a wavelength-locked light source at the high speeds due to the response time of the non-lasing wavelength-locked light source. However, the hybrid WDM-PON with both high power, high speed, wavelength-specific light sources as well as low cost, wavelength-locked light sources can be used to achieve a cost effective asymmetric communication system. High speed wavelength-specific light sources may be used to send higher speed data in one direction. Wavelength-locked light sources may be used for data transfer in the reverse direction at a slower speed. The ratio between the high speed data rates, such as 10 Gbps, and the slower speed data rates, such as 155 Mbps, can be greater than fifty to one.

The hybrid WDM-PON retains the advantage of having identically manufactured ONUs with low cost transmitters in the field (i.e. installed in subscriber'locations). The consumable ONUs makes them easier for maintenance, service and repair. The wavelength-specific light sources are located in the Central Office interface where maintenance is easier and there is less chance of confusing which wavelength-specific light source is connected to each port of the first 1×N multiplexer/demultiplexer.

In an embodiment, the wavelength-specific light sources at the interface can be directly modulated DFB lasers. For an example 16 wavelength system, the hybrid WDM PON can use 16 different DFB lasers separated by 200 GHz (or 1.6 nanometers (nm) in wavelength). The total range of the down stream bandwidth is approximately 26 nm, i.e. 16 channels X 1.6 nm/channel. Each DFB laser can be stabilized or locked to the appropriate channel by using a thermo-electric coder (TEC) to temperature control the DFB chip temperature. Since the wavelength/temperature sensitivity for a DFB laser may be 0.1 nm/degree Centigrade (° C.), temperature stability merely should be maintained within a few degrees since the channel spacing is 1.6 nm. The example DFB lasers can be directly modulated above 1.25 Gbps to transfer a high speed downstream data signal. Higher and lower data rates can also be used.

The downstream wavelength band for the optical transmitters in the interface may be in a first wavelength band such as the L-band (1570 nm~1600 nm), O-band (~1310 nm), S-band (1450 nm), etc. The upstream wavelength band for the optical transmitters in the end user's locations may be in a second wavelength band, such as the C-band, different than the first wavelength band. Accordingly, the broadband light source, such as an Erbium Doped Fiber Amplifier source, may generate a broadband light signal encompassing the C-band. The second 1×N multiplexer/demultiplexer then spectrally slices up in the incoming C-band light signal to send each end user location its own discrete wavelength.

In one embodiment, in addition to feeder optical fiber 650, another backup feeder optical fiber may be inserted between interface 630 and remote node 640 to provide a backup route for the data transmission if the feeder optical fiber 650 breaks. The backup feeder optical fiber may be physically routed in a separate location and in a different bundle of fibers then the feeder optical fiber 650. The redundancy may be automatically switched into operation with a switch.

Various devices may be used to fine tune the resonant wavelength of the optical transmitters in the interface and end user locations such as the above mentioned temperature controllers, MEMS (Micro Electro-Mechanical Structures), dielectric optical band pass filters for feedback, Fiber Bragg Gratings (FBG) using strain tuning and other techniques.

Figure 7:
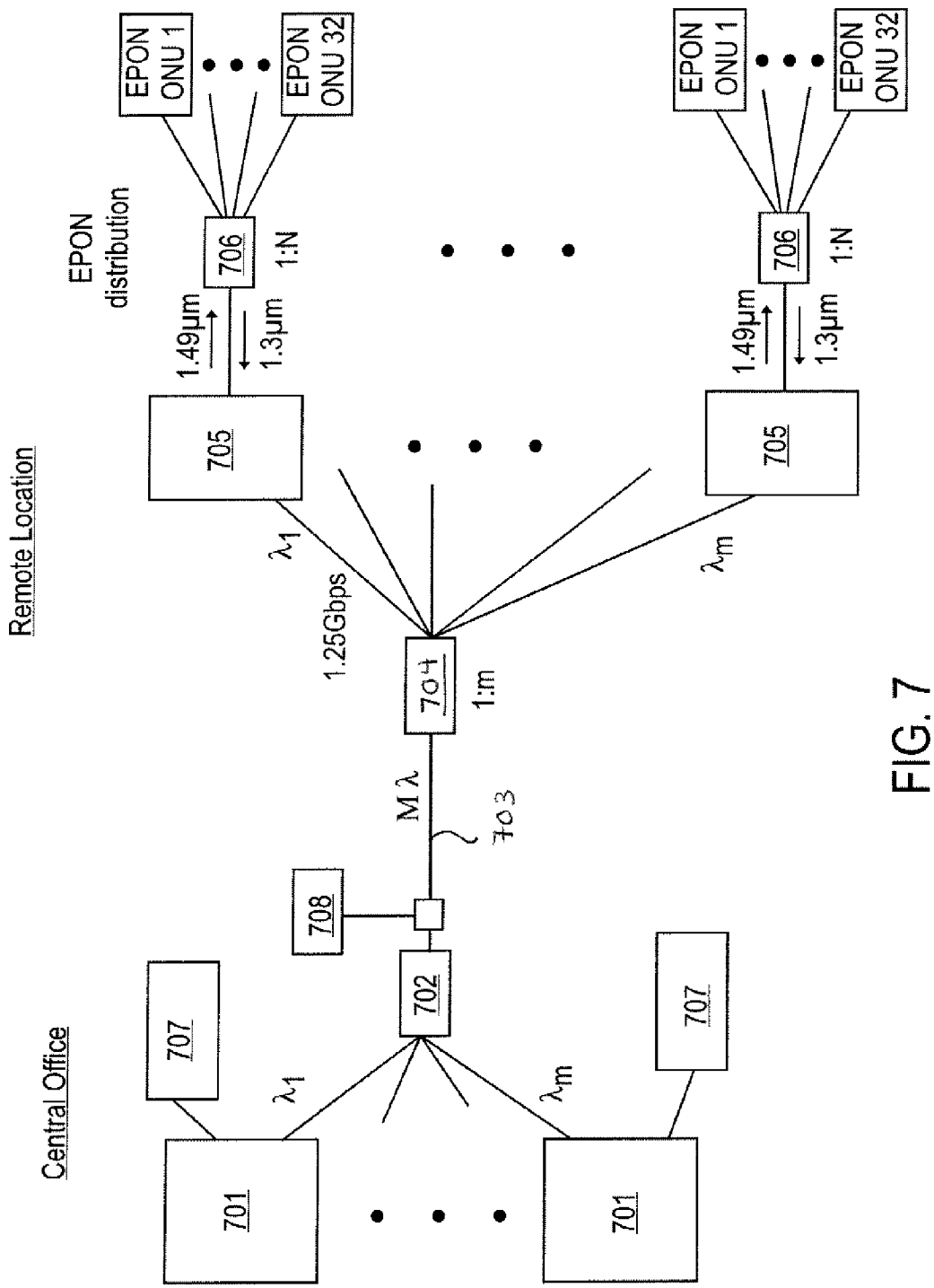
FIG. 7 shows another embodiment of a WDM PON transporting an EPON platform.

FIG. 7 shows another embodiment of WDM PON 700, e.g., DWDM PON, transporting an EPON platform. As shown in FIG. 7, WDM PON 700 includes 1 to M EPON Optical Line Terminal ("EPON OLT") cards 701, wherein M is an integer number, e.g., 16. Each of EPON OLT cards 701 has a bidirectional WDM PON optical transceiver, which contains an optical receiver and at least one wavelength locked light source, as described above with respect to FIGS. 5 and 6. EPON OLT cards 701 are located at a Central Office and are compatible with the EPON access interface in the Central Office. Each of EPON OLT cards 701 outputs WDM set of signals having a wavelength $\lambda m$, wherein m is an integer number corresponding to each of the respective EPON OLT cards 701. EPON OLT card 701, while being compatible with EPON access interface in the Central Office, eliminates at least one of the interface conversions, e.g., at least one O-E-O conversion, between EPON access platform and WDM platform. As such, EPON OLT card 701 is more cost effective relative to existing EPON OLT cards. EPON OLT card 701 may simply replace existing EPON OLT cards without affecting functions of the existing EPON OLTs, e.g., compatibility with the EPON access interface in the Central Office. WDM PON 700 further includes a multiplexer/demultiplexer ("MUX/DMUX") 702 coupled to EPON OLT cards 701 to multiplex WDM set of signals for transmission through an optical fiber 703. For one embodiment, MUX/DMUX 702 includes Arrayed Waveguide Grating Multiplexers and Demultiplexers ("AWG MUX/DMUX") known to one of ordinary skill in the art of telecommunications. For another embodiment, MUX/DMUX 702 includes thin film dielectric filters known in the art of telecommunications. As shown in FIG. 7, a broadband light source 708 supplies a separate spectral slice of light through the optical fiber 703 to lock an output wavelength of at least one wavelength-locked light source of WDM PON to EPON O-E-O converter 705, as described above with respect to FIG. 6.

As shown in FIG. 7, WDM PON 700 further includes a MUX/DMUX 704, which demultiplexes WDM set of signals from optical fiber 703, such that a WDM signal having a respective wavelength $\lambda m$ is sent to a respective WDM PON to EPON O-E-O converter 705. MUX/DMUX 704 may be located at a remote location from a Central Office. For one embodiment, MUX/DMUX 704 includes AWG MUX/DMUX, thin film dielectric filters, or a combination thereof. AWG MUX/DMUX and thin film dielectric filters are known to one of ordinary skill in the art of telecommunications. As shown in FIG. 7, each of converters 705 inputs a WDM signal at a WDM wavelength and outputs an optical EPON signal, which is sent to a 1:N power splitter 706 for access platform distribution between customer premises, e.g., between EPON ONUs 1 to N, wherein N may be any integer number, e.g., 32. The WDM PON 700 is used to transport data in opposite directions, downstream and upstream, as described above with respect to FIGS. 4-6.

As shown in FIG. 7, WDM PON 700 includes one or more monitors 707 to provide diagnostics of the WDM PON 700. As discussed, a WDM Optical Time Domain Reflectometer ("OTDR") may be used to optically diagnose the infrastructure of WDM PON 700. In one embodiment, one or monitors 707 monitor the status of the one or more OEO converters associated with the EPON OLT cards 701. Monitors are coupled to EPON OLT cards 701, as shown in FIG. 7, to provide a remote diagnostics of the OEO converters located at the Central Office and at a remote location. For example, monitors 707 may diagnose failure of one or more OEO converters and provide such information to the network management system (not shown), which controls a proper operation of the WDM PON 700. Monitors 707 provide remote diagnostics without disturbing the transparency of the data conversion. For one embodiment, the remote diagnostics of the OEO converters may be realized by adding an additional modulation signal ("monitoring signal") onto the data signal. The data transmission rates for remote diagnostics are substantially smaller than the data transmission rates for the data optical signal, so the additional perturbation of the data optical signal, which may be caused by an additional modulation signal, is minimized. The amplitude of the monitoring set of signals may be substantially smaller than the amplitude of the data set of signals. The monitoring signal provided to monitors 707 is outside the bandwidth used for the data transmission over the WDM PON 700. For example, the small monitoring signal provided to monitors 707 may be a low-frequency signal, e.g., below about 10 KHz. Alternatively, the small monitoring signal provided to monitors 707 may be a high-frequency signal, above the frequency bandwidth used for data transmission. In yet another embodiment, the monitoring signal provided to monitors 707 may have a wavelength, which is different from the wavelengths of the signals used to data transmission. For example, because additional wavelength bands exist in the WDM PON architecture, the remote monitoring can be performed over an additional wavelength.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A wavelength division multiplexing passive optical network (WDM-PON) for performing bi-directional communication, the WDM-PON comprising:

a first interface at an access point to input a first set of signals configured to comply with a first transmission platform and output a second set of signals based on the first set of signals, wherein each of the second set of signals has a different wavelength, which is mapped to a corresponding one of the first set of signals, wherein the second set of signals are configured to comply with a WDM-PON data transmission platform while having a data transmission sequence in compliance with the first transmission platform and to propagate according to the WDM-PON transmission platform through a transmission medium; and one or more first remote distribution nodes coupled to the access point, wherein the transmission medium carries the second set of signals traveling along optical channels in a first direction.

2. The WDM-PON of claim 1, wherein the first interface includes three or more wavelength locked optical transmitters.

3. The WDM-PON of claim 1, wherein the access point is the Central Office.

4. The WDM-PON of claim 1 further comprising:
a second interface coupled to the first interface, wherein the second interface transfers the second set of signals complying with the WDM-PON data transmission platform at a distribution point into a third set of signals complying with the first transmission platform.

5. The WDM-PON of claim 1, wherein the first interface maintains a data sequence of the first set of signals by examining the data in a first signal of the first set of signals and data modulating that information onto a first wavelength transmitted in the WDM-PON.

6. The WDM-PON of claim 1, wherein the optical spacing between optical channels is less than 10 nm.

7. The WDM-PON of claim 1, further comprising
one or more second remote distribution nodes coupled to the one or more first remote distribution nodes.

8. A WDM PON system, comprising:
a Central Office and a remote node;
a first interface coupled to the Central Office to input a first signals configured to comply with a first transmission platform, to convert the first signals into a second signals, wherein each of the second set of signals has a different wavelength, which is mapped to a corresponding one of the first set of signals, wherein the second set of signals is configured to comply with a WDM transmission platform while having a data transmission sequence in compliance with the first transmission platform, and to output the second set of signals to propagate through an optical transmission medium complying with the WDM transmission platform, wherein the first interface includes a plurality of wavelength locked transmitters; and
a second interface coupled to the remote node, the second interface to input the second set of signals from the optical transmission medium and to output a third set of signals, wherein the third set of signals is configured to comply with the first transmission platform.

9. The system of claim 8, wherein the second set of signals preserves the sequence of the data in the first set of signals.

10. The system of claim 8, wherein the first platform is an access platform.

11. The system of claim 8, wherein the first interface is located at a Central Office and the second interface is located at the remote node.

12. The system of claim 8, wherein the optical spacing between signals of the second set is less than 10 nm.

13. The system of claim 8, wherein the second set of signals has an adjustable data transmission rate.

14. The system of claim 8, wherein the first set of signals is in an electrical format.

15. An apparatus, comprising:
a line terminal having an input to receive a first set of signals configured to comply with an access transmission platform, and
a converter to convert the first set of signals to a second set of signals, wherein each of the second set of signals has a different wavelength mapped to a corresponding one of the first set of signals, the second set of signals configured to comply with a WDM transmission platform while having a data transmission sequence in compliance with the first transmission platform, and to output the second set of signals to propagate through an optical transmission medium to a remote node, wherein the line terminal contains one or more wavelength locked optical transmitters.

16. The apparatus of claim 15, further comprising
one or more optical network units coupled to the remote node, the one or more optical network units to input the WDM set of signals and to output the access platform set of signals.

17. The apparatus of claim 15, wherein the spacing between the WDM set of signals is less than 10 nm.

18. The apparatus of claim 15, wherein the line terminal further includes one or more monitors.

19. The apparatus of claim 15, further comprising: an optical multiplexer/demultiplexer coupled to the one or more remote optical network units to multiplex/demultiplex WDM set of signals propagating through the optical transmission medium.

20. A WDM PON fiber plant, comprising:
one or more converters having an input to receive a first set of signals having an access platform and an output to output a second set of signals, wherein each of the second set of signals has a different wavelength, which is mapped to a corresponding one of the first set of signals, wherein the second set of signals is configured to propagate through an optical transmission medium in compliance with a WDM platform while having a data transmission sequence in compliance with the first transmission platform; and
an arrayed waveguide multiplexer/demultiplexer coupled to the one or more converters.

21. The WPON fiber plant of claim 20, wherein the second set of signals preserves a sequence of data from the access platform of the first set of signals.

22. The fiber plant of claim 20, wherein the one or more converters include a wavelength locked light source.

23. The method of claim 22, wherein the first platform is an access platform.

24. The method of claim 22, wherein the outputting the second set of signals comprises outputting a wavelength locked signal.

25. A method, comprising:
inputting a first set of signals configured to comply with a first transmission platform;
converting the first set of signals into a second set of signals, wherein each of the second set of signals has a different wavelength, which is mapped to a corresponding one of the first set of signals, wherein the second set of signals are configured to comply with a WDM transmission platform while having a data transmission sequence in compliance with the first transmission platform;
outputting the second set of signals to propagate through a single optical transmission medium according to the WDM transmission platform;
inputting the second set of signals from the single optical transmission medium; and outputting a third set of signals, wherein the third set of signals is configured to comply with the first transmission platform of the first set of signals.

26. The method of claim 22, wherein the outputting the second set of signals comprises maintaining a sequence of the data in the platform of the first set of signals.

* * * * *